United States Patent
Joslyn (10) Patent No.: US 7,678,002 B2
(45) Date of Patent: Mar. 16, 2010

(54) ONE-WAY CLUTCHED DAMPER FOR AUTOMATIC BELT TENSIONER

(75) Inventor: Robert C. Joslyn, Christian County, MO (US)

(73) Assignee: Dayco Products, LLC, Tulsa, OK (US)

( * ) Notice: Subject to any disclaimer, the term of this patent is extended or adjusted under 35 U.S.C. 154(b) by 344 days.

(21) Appl. No.: 11/514,136

(22) Filed: Aug. 31, 2006

(65) Prior Publication Data

US 2008/0058142 A1    Mar. 6, 2008

(51) Int. Cl.
F16H 7/12    (2006.01)
(52) U.S. Cl. ..................................... 474/135
(58) Field of Classification Search ................ 474/101, 474/113, 117, 118, 133, 135, 136, 138; 192/207, 192/30 V, 214.1, 214, 55.5, 41 S, 81 C
See application file for complete search history.

(56) References Cited

U.S. PATENT DOCUMENTS

| | | | |
|---|---|---|---|
| 4,270,906 A * | 6/1981 | Kraft et al. ................... | 474/135 |
| 4,583,962 A | 4/1986 | Bytzek et al. | |
| 4,596,538 A | 6/1986 | Henderson | |
| 4,826,471 A * | 5/1989 | Ushio .......................... | 474/135 |
| 4,832,665 A | 5/1989 | Kadota et al. | |
| 5,558,370 A | 9/1996 | Behr | |
| 5,598,913 A | 2/1997 | Monahan et al. | |
| 6,231,465 B1 | 5/2001 | Quintus | |
| 6,375,588 B1 | 4/2002 | Frankowski et al. | |
| 6,422,962 B1 | 7/2002 | Lehtovaara et al. | |
| 6,478,118 B2 | 11/2002 | Astrom et al. | |
| 6,554,318 B2 | 4/2003 | Kohut et al. | |
| 6,834,631 B1 | 12/2004 | Blackburn et al. | |
| 6,863,631 B2 * | 3/2005 | Meckstroth et al. ......... | 474/135 |
| 2003/0008739 A1 | 1/2003 | Asbeck et al. | |
| 2003/0153421 A1 | 8/2003 | Liu | |
| 2006/0293135 A1 * | 12/2006 | Quintus et al. ............... | 474/135 |

FOREIGN PATENT DOCUMENTS

WO    WO2004109247 A2    12/2004

* cited by examiner

*Primary Examiner*—Robert A Siconolfi
*Assistant Examiner*—Vu Q Nguyen
(74) *Attorney, Agent, or Firm*—Thompson Hine LLP (57) ABSTRACT

A new tensioner is disclosed that achieves asymmetric damping in part by using a moveable ramp plate. The moveable ramp plate is in frictional contact with the arm provides asymmetric frictional damping for the tensioner arm when the arm experiences wind-up and begins to move away from the belt. The ramp plate is rotatably associated with the movement of the tensioner arm through a spring. The tensioner arm may pivot in two directions. As the tensioner arm pivots in a direction toward the belt the ramp plate is urged such that friction between the ramp plate and tensioner are minimized. When the tensioner arm pivots in the opposite direction, as potentially typified by wind-up, the ramp plate is urged such that friction between the ramp plate and tensioner is increased thereby minimizing wind-up of the tensioner arm.

22 Claims, 4 Drawing Sheets

ONE-WAY CLUTCHED DAMPER FOR AUTOMATIC BELT TENSIONER

TECHNICAL FIELD

The present invention relates generally to tensioners and more particularly to an asymmetrically damped tensioner utilizing a ramp plate clutch operatively engaged with the tensioner arm.

BACKGROUND

It is common for a belt tensioner to have a means to dampen movement of the tensioner arm caused by belt tension fluctuation. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occur as a result of manufacturing variation, operating temperature and component break-in or wear can also cause the tensioner to be unresponsive.

Timing belt systems have benefited from the use of asymmetric damping to address this problem. An asymmetrically damped tensioner provides damping when additional belt tension is encountered but is free to respond to slack belt conditions. Although asymmetric functionality may not be required for all other front end accessory drive tensioners, the potential for increased service life, solving other transient dynamic system problems including belt slip during a 1-2 gear shift, or simply making the tensioner less sensitive to damping variation make it a desirable design option.

One current solution to this problem uses a viscous linear damper mechanism, such as a shock absorber, attached to a pivoting arm. Asymmetric damping is achieved through, for example, check valves and different orifice sizes in the shock absorber. This solution, however, tends to be expensive and requires more packaging space than a conventional tensioner. Other solutions use wedges that increase damper friction during wind-up or spring loaded self-energizing brake shoe elements. These designs, however, tend to complex with many small parts to assemble.

One-way clutch mechanisms have been proposed, for example in U.S. Pat. Nos. 4,583,962 and 6,422,962, for timing belt tensioners for the purpose of preventing or limiting back travel to prevent tooth jump. These "ratcheting" tensioners, however, lack the ability to relieve belt tension sufficiently when not required. Other timing belt tensioner proposals including, for example, U.S. Pat. Nos. 4,832,665 and 6,375,588, use a one-way device coupled to a viscous damper. Although these devices offer good functionality, retention of the viscous fluid throughout the service life can be difficult. Yet another design disclosed in U.S. Patent App. Publication 2003/0008739 uses friction generated by the clamping action of a wrap spring clutch to provide damping.

The aforementioned tensioner designs are not ideal. Accordingly, a new tensioner design is desired.

DETAILED DESCRIPTION

The new tensioner disclosed herein provides an asymmetric frictional damper that will activate during a wind-up (i.e. untensioning) to mitigate the deleterious effects of wind-up. Wind-up results when increasing belt tension causes the belt to lift the tensioner arm in a direction away from the belt. To mitigate the negative effects of wind up, it is desirable to have a frictional damper on the tensioner arm that will resist the lifting of the tensioner arm from the belt without adversely effecting movement of the tensioner arm toward the belt. This kind of frictional damping operating to resist lifting of the tensioner arm only is generally known as asymmetric damping.

The new tensioner disclosed herein achieves asymmetric damping in part by using a moveable brake element, which may be referred to herein as a ramp plate. The ramp plate may be comprised of multiple ramp plates that interface with each other, or a single ramp plate that interfaces with fixed elements of the tensioner. The moveable ramp plate provides one-way or asymmetric frictional damping for the tensioner arm when the arm begins to move away from the belt in order to oppose the movement away from the belt. The moveable ramp plate enables the device to apply progressively more frictional damping to counteract the lifting of the tensioner arm from the belt the further the tensioner arm is lifted. The ability to progressively increase frictional damping relative to displacement of the tensioner arm enables the device to provide greater frictional damping in response to greater displacements of the tensioner arm away from the belt. This creates a feedback loop to combat the deleterious effects of wind-up; the more the tensioner arm is driven away from the tensioned belt, the more frictional damping is applied to stop the wind-up. The asymmetric damping may be tailored such that it will not restrict all movement in the wind-up direction thereby providing additional compliance that is advantageous for some applications. Since the damping is asymmetric in nature by design, as the tensioner returns to normal operation—whereby the tensioner arm returns back to a tensioning contact with the belt—the amount of frictional damping applied to the motion of the device in the tensioning direction is less than that applied to combat wind-up.

Figure 1:
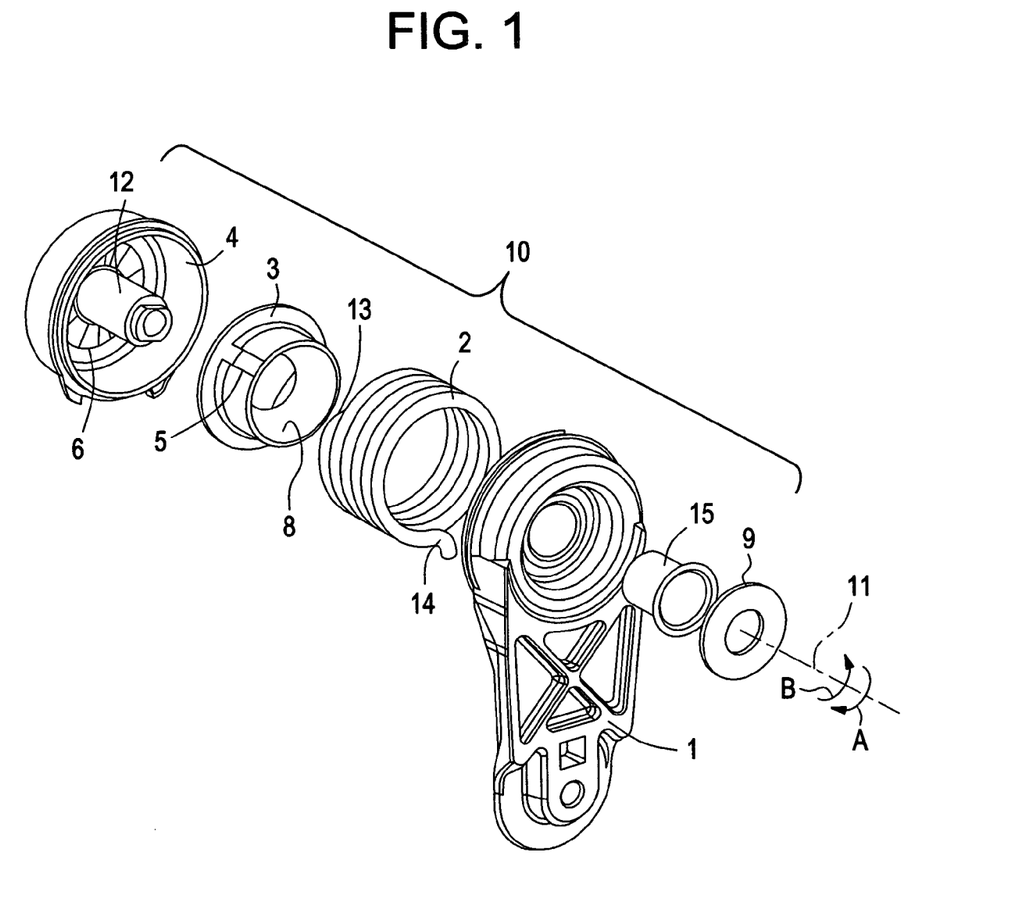
FIG. 1 is an exploded perspective view of a new tensioner assembly according to one embodiment.

Referring now to the embodiment shown in FIG. 1, the tensioner 10 includes an arm 1. The arm 1 is connected with tensioner base 4 and is able to rotate around a pivot axis 11. The arm 1 is biased by a torsional spring 2. The distal end of the arm 1, opposite the pivot axis 11, is where the pulley (not shown) would contact the belt to be tensioned (also not shown). The tensioner 10 is designed to provide a force on the pulley (not shown) mounted on the distal end of the arm 1 through the generation of a torsional force around the pivot axis 11 in the direction A by the torsion spring 2. Wind-up of the tensioner in the opposite direction B is combated by bias of the torsional spring 2 augmented by the asymmetric frictional damping mechanism. The asymmetric frictional damping does not substantially impede movement of the arm 1 in direction A while substantially limiting movement of the arm 1 in direction B through the application of progressively greater frictional damping as the tensioner arm 1 is further displaced.

In the embodiment shown in FIG. 1, the tensioner base 4, provides the means for affixing the tensioner to the engine or device. The methods of affixing the tensioner base to the engine or device are not detailed in the drawing, however multiple methods are well known in the art including, but not limited to the use of welds, bolts, screws, and locking structures. Alternatively, the tensioner maybe mounted to the engine or device on the opposite side of the tensioner arm from the tensioner base using an axle passing through the tensioner along the pivot axis. Regardless of the method of mounting the device to the engine or device, the approaches taken to create the asymmetric forces to combat wind-up are substantially unchanged.

The tensioner base 4 in the embodiment shown in FIG. 1 includes both a tensioner axle 12 and ramp features 6. The tensioner axle 12 is substantially coaxial with the pivot axis 11. The tensioner axle 12 provides a bearing surface that enables both rotational and translational movement of components in the tensioner 10. The rotational axis of tensioner 10 components is substantially coaxial with the pivot axis 11. The translational motion of tensioner 10 components is substantially parallel to and along to the pivot axis 11. The tensioner base 4 also has a series of base ramp features 6 formed on its interior surface facing the tensioner arm. In the embodiment shown in FIG. 1 these base ramp features 6 are substantially arrayed circumferentially around the tensioner axle 12. The base ramp features 6 are substantially fixed or immoveable in the both the rotational and axial directions.

The tensioner base 4 depicted in FIG. 1 also has an external housing with a sealing ring. The external housing with sealing ring provides protection for the internal mechanisms of the tensioner and enables the internal mechanisms of the tensioner to be sealed against debris and to enable the tensioner as a whole to retain lubricants. There are many methods of sealing the internal mechanism of the tensioner known to those skilled in the art, in this particular embodiment part of the sealing mechanism is integrated into the tensioner base 4.

The tensioner base, including the base ramp features, tensioner axle and other elements can be fabricated as a single unit or fabricated in different components and then joined together using a variety of methods. In one embodiment, the a second ramp plate can be formed with the ramp features 6 and that second ramp plate may then be integrated with the tensioner base 4 to form a tensioner base 4 with ramp features 6. The entire unit may be fabricated as a single unit using a variety of techniques including forging, casting, die-casting, sintering, machining and other common fabrication methods. Alternatively components of the design can be fabricated as different components and then integrated into a single composite unit using techniques such as sintering, welding, bonding, bolting, and even interference fits. A example of such a design would be fabricating the ramp elements as a separate component which is then integrated into a tensioner base component in a receptacle designed for the ramp element component. By fabricating the individual elements as separate components it may be easier to provide specific surface or heat treatments or coatings to a component separate from the entire integrated unit.

Figure 2:
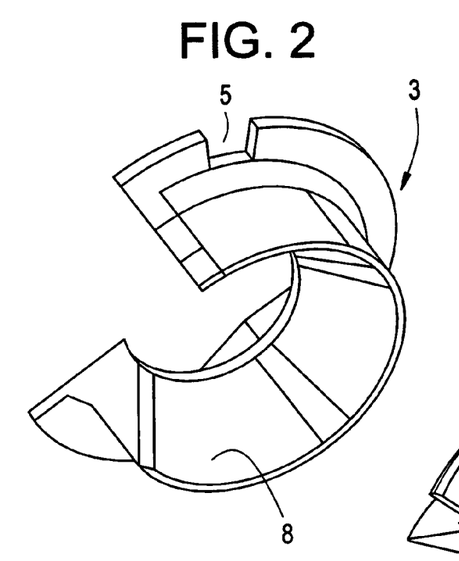
FIG. 2 is a cut away perspective view of a ramp plate according to one embodiment.
Figure 3:
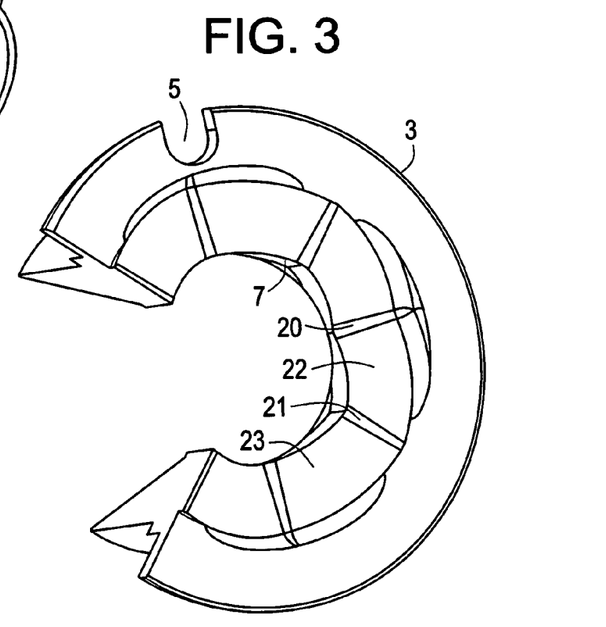
FIG. 3 is a rear, cut away, perspective view of the ramp plate in FIG. 2.

Referring to FIGS. 1 and 3, the ramp plate 3 interfaces with the tensioner base 4 via the ramp features 7 on the ramp plate 3 (FIG. 3) and the fixed mating ramp features 6 on the base 4 (FIG. 1). The ramp plate 3 also has a friction surface 8, shown in FIG. 2. Referring again to FIG. 1, the friction surface 8 interfaces with a mating friction surface (not shown) located on the tensioner arm 1 facing the ramp plate 3. The ramp plate 3 is both rotatable about and translatable up and down the pivot axis 11. The ramp plate 3 also possesses a spring engagement point 5, which is sized to accept a tang 13 attachment on the torsion spring 2.

The frictional surfaces on the ramp plate and tensioner arm can be flat, cup and cone shaped, or ball and socket shaped. FIG. 2 shows an embodiment of the ramp plate with a cup and cone type of friction surface 8. This list of alternative configurations for the friction surfaces on the ramp plate and tensioner arm is by no means exhaustive and is merely provided as a non-exhaustive set of examples of alternative structures that might be selected by those of ordinary skill in the art.

The torsion spring 2 shown in FIG. 1, has two attachment tangs 13 and 14. The attachment tangs interface with the ramp plate 3 at the spring engagement point 5 and the tensioner arm 1 (spring engagement point not shown) respectively. The torsion spring 2 provides a torsional force to both the tensioner arm 1 and the ramp plate 3. In the case of the tensioner arm 1, the torsional force or torque generated by the torsional spring 2 urges the tensioner arm 1 into the belt being tensioned in order to tension the belt during normal operations. On the opposite end of the torsion spring 2, the opposing torsional force or reaction force, or torque generated by the torsional spring 2 urges the ramp plate 3 to rotate in the opposite direction from the tensioner arm 1. The urge imposed on the ramp plate 3 causes the ramp plate 3 to move up the ramp features 6 and 7 until an equilibrium state is reached. The torque generated by the torsional spring, may in some embodiments, be supplemented with another spring that is not attached to the ramp plate and only provides an urge to the tensioner arm 1 directly.

During normal operation (tensioning of the belt without wind-up) of the embodiment depicted in FIG. 1, the ramp plate 3 is urged up the ramp features 6 and 7 by the action of the torsional spring 2. The motion of the ramp plate 3 up the ramp features is inhibited by the contact of the ramp plate friction surface 8 with the mating friction surface on the tensioner arm 1 (not shown) and to a lesser extent by the friction of the ramp features themselves. The normal force generated by the ramp features in normal operation on these two frictional surfaces is small enough to minimize frictional damping during normal operation. The normal force generated does however equilibrate, through the action of the ramp features, the torsional force generated by the torsion spring 2 during normal operation thereby stopping the movement of the ramp plate 3 up the ramp features 6 and 7. The magnitude of tension provided by the tensioner arm 1 against the belt during normal operation is predominantly controlled by the torsional spring 2 which is dictated by the amount of preloading, spring constant, and other well controlled characteristics of torsion springs know to those of ordinary skill in the art.

Still referring to the embodiment depicted in FIG. 1, during a wind-up condition (where the tensioner arm 1 is pushed away from the belt being tensioned) the movement of the tensioner arm away from the belt causes the torsional spring 2 to be loaded. The loading of the torsional spring 2 by the movement of the tensioner arm creates a greater torsional or reaction force (as dictated primarily by the spring constant (k) of the spring as well as other spring parameters). The increase in torsional force generated by the loading of the torsional spring 2 is applied to the ramp plate 3 through its attachment to the torsional spring 2 via the tang 13 and the spring engagement point 5. The increased torsional force urges the ramp plate to rotate further up the ramp features 6 and 7 due to the increased force. The movement of the ramp plate 3 up the ramp features increases the normal force applied to the friction surfaces. A schematic detail of the interactions between one set of ramp features is highlighted in FIG. 4 where the contact region 24 is highlighted. The increase in normal force on the friction surfaces increases the frictional dampening generated by the interaction between the ramp plate 3 and the tensioner arm 1, as detailed in FIG. 1. Since motion in the wind up direction is translated through the torsional spring 2 to the ramp plate 3 and by action of the ramp features 6 and 7 into a normal force applied to the tensioner arm 1, increasing wind up generates increasing normal force applied to the frictional surfaces, which then increases frictional damping, thereby combating the wind-up of the tensioner arm.

Still referring to the operation of the embodiment depicted in FIG. 1, as the wind-up condition begins to dissipate and the tensioner arm 1 is no longer being forced away from the belt, the arm will be urged into the belt by the torsion spring 2. As the arm is urged back toward its normal operating condition, the ramp plate 3 will fall back down the ramp features 6 and 7 due to the reduced torsional force applied to the ram plate by the torsional spring 2. As the ramp plate 3 backs down the ramp features, the amount of normal force applied to the interface of the friction surface 8 on the ramp plate to the frictional surface (not shown) on the tensioner arm 1 is reduced. The reduction in the normal force applied to these frictional surfaces thus reduces the effective frictional damping operating on the tensioner 10 and achieves the desired asymmetric damping.

It is apparent that the operation of the device and the rate or profile of asymmetric damping generated can be modulated by controlling several features of the embodiment shown in FIG. 1 using techniques known to those of ordinary skill in the art. Specific elements that may be changed to modulate the performance characteristics of the damper include, but are not limited to the following. The frictional surface 5 on the ramp plate 3 and its mating frictional surface (not shown) on the tensioner arm 1 can be modulated to vary the amount of frictional force generated due to application of a specific normal force. The normal force applied to the frictional surfaces can be modulated by changing the characteristics of the ramp features 6 and 7 and the torsional spring 2. The ramp features can have a variety of different profiles and shapes (see detailed description below) in order to modify the operation of the device and translate the rotational movement of the ramp plate 3 into an axial movement of the ramp plate 3 into the tensioner arm 1, to generate the normal force on the friction surfaces which then generates the asymmetric damping during a wind-up condition. The spring constant of the torsional spring 2 is controlled in order to create the rotational urge experienced by the ramp plate during both normal operation and during the wind-up condition. All of these elements can be tailored by a designer of ordinary skill to achieve specific tension during normal operations and thereby create a specific asymmetric damping profile when the tensioner experiences a wind-up condition.

The ramp plate with its various elements may be fabricated as either a single unit or fabricated as multiple components and then joined together into a single complete or composite unit using a variety of methods. For example, the entire component may be fabricated as a single unit using a variety of techniques including, but not limited to, forging, casting, die-casting, sintering, machining, and other common fabrication methods. Alternatively parts of the ramp plate can be fabricated as different components and then integrated into a single composite unit using techniques such as sintering, welding, bonding, bolting, and interference fits. In one example of a multi-unit fabrication, the ramp plate may be fabricated in three distinct elements that are then integrated into the ramp plate. The ramp plate could have a base structural unit which provides the primary bearing surface for the ramp plate to translate up and down and around the pivot axis and also provide a physical structure for integrating the other units of the ramp plate. The other two elements, the ramp features and frictional surface can then be fabricated as separate units and integrated into the base structural unit. The fabrication of the ramp features and the frictional surface as separate elements provides the designer with greater freedom to select different materials, heat or surface treatments, and coatings to provide a few examples which can be adopted to modulate the operation of the device. Regardless of fabrication methods selected, the operation of the ramp plate remains constant.

The tensioner arm 1, in FIG. 1, is also shown in this particular embodiment with a bushing 15. The bushing 15 is a substantially cylindrical structure that is inserted into a passage through the tensioner arm 1 that is substantially aligned with the pivot axis 11. The bushing 15 provides a bearing surface for the rotation and translation of elements of the tensioner 10 along and about the pivot axis 11.

The end nut 9, shown in FIG. 1, holds the tensioner 10 assembly together along the pivot axis.

Referring again to FIG. 1, the ramp features 6 and 7 are arranged in a substantially circular array around the pivot axis 11 on both the ramp plate 3 and the tensioner base 4 respectively. The ramp features 6 and 7 are designed to be in contact during normal operation of the tensioner 10. The ramp features depicted in FIG. 3 show a substantially symmetric pattern whereby each discrete repeating ramp element has substantially the same pattern up and down. The ramp features may vary in the radial direction from the pivot axis in order to maintain a constant interface with the mating surface and modulate specific properties of the damper during operation. Although the ramp features 7 on the ramp plate 3 show a symmetrical repeating pattern, the ramp features can have a unique or alternatively an asymmetric pattern to achieve specific operational characteristics.

Figure 4:
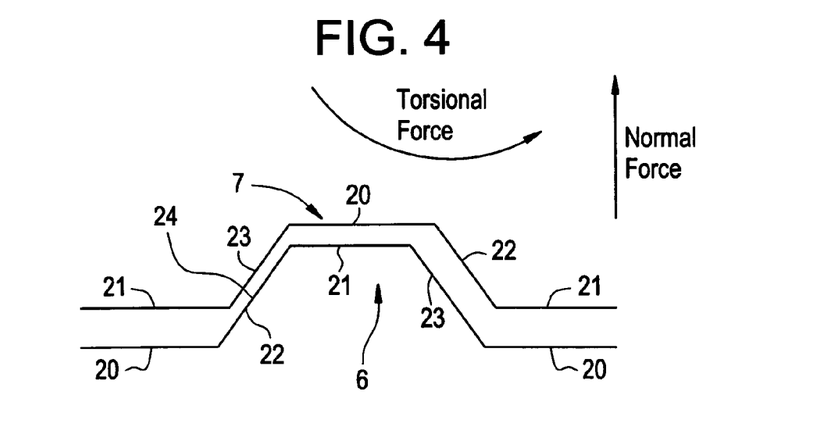
FIG. 4 is a schematic depicting the interface between a tensioner base and a ramp structure according to one embodiment.

A schematic detail view of mating ramp features is provided in FIG. 4. The general structure of an arbitrary section of ramp features on both the ramp plate and tensioner base can be broken into four repeating elements. These elements are lower dwell 20, ramp up 22, upper dwell 21, and ramp down 23. Upper and lower areas are defined from the interface surface of the part, i.e. from the respective surfaces of the ramp plate and the tensioner base where they interface with each other. Although the profile section shown in FIG. 4 details a set of straight-line features, two important points must be recognized. First in the radial direction away from the axis of rotation of the device, the actual ramp profiles may vary significantly along this reference line in order to minimize relative slipping, reduce friction, provide balanced loading, and achieve other objectives. An example of one embodiment of this approach can be seen in the isometric profile shown in FIG. 3 where the same lower dwell 20, ramp up 22, upper dwell 21, and ramp down 23 surface features are depicted. Second, although the profiles shown in FIG. 4 are straight lines, the device can use any number of alternative profiles for the ramps including multi-faceted or curvilinear forms. For example, the upper and lower dwells 21 and 20 respectively could be merely fillets or radius connecting the upward and downward ramps, similar to the embodiment shown in FIG. 3. Alternatively the dwells and ramps could be constructed in such a way as to provide a detent or delay in switching between normal operation and the asymmetric damping needed during a wind-up situation. The shape of the ramp features (up and down and dwells) may be selected from a wide variety of profiles with a wide range of rectilinear and curvilinear shapes. The ramp features maybe repeated at any arbitrary interval over the length of the ramp feature or be unique with no repeating pattern whatsoever. Although the embodiment depicted here has a symmetric repeating profile, where each edge of a specific ramp feature has equivalent features on each side, it is also possible to use an asymmetric profile. The asymmetric profile can at the extreme resemble a saw-tooth configuration, where the areas of the ramp features not in contact are typified by a sharp drop rather then a gradual ramp down.

The number of ramp plate features, as defined as a single unit may be selected from a wide range of possible alternative arrangements. Preferably the number of ramp feature units is equal to or more than 4. More preferably the number of ramp features is equal to or more than 6. Most preferably the number of ramp features is equal to or greater than 8.

Referring again to FIG. 4, during normal operation, the corresponding ramp up 22 and ramp down 23 on opposing surfaces will normally be in contact. The rotational urge applied to the rotatable ramp plate will cause these two surfaces to be in contact. The angle of the ramp features off the perpendicular of the face of plates causes the ramp plate to also translate or slide along the pivot axis and provides a normal force to the friction surfaces of the ramp plate and the tensioner arm as described above. This normal force causes a level of frictional damping during normal operation that does not significantly impair the performance of this embodiment. During a wind-up condition, the movement of the tensioner arm away from the tensioned belt causes an additional torsional urge to be applied to the ramp plate. This additional torsional urge coupled with the angle of ramp features causes the ramp plate to move or translate up the ramp features. The upward movement of the ramp plate up the ramp features, imparts a greater normal force to the frictional damping surfaces on the interface between the ramp plate and the tensioner arm. The increased normal force, imparts greater frictional damping to the tensioner arm to resist the wind-up motion.

The tensioner may be designed such that a customized relationship between specific levels of wind-up result in the generation of specific levels of frictional damping in response. The designer may select parameters in the design of a specific embodiment to create a desired profile or relationship between specific movement of the tensioner arm and specific levels of frictional damping which are applied. One of the elements controlled by the designer is the spring which couples a movement of the tensioner arm with the ramp plate. The selection of spring parameters, including spring constant (k), pre-loading, and others provide the first set of parameters available to the designer. A second set of parameters available to the designer for controlling the asymmetric damping profile of the device is the profile, size, number, structure, and relative friction of the ramp features. The relative sliding of the ramp features over each other is directly responsible for translating or directing the rotational urge applied to the ramp plate into a normal force that is applied to the friction contact between the ramp plate and the tensioner arm thereby modulating the level of frictional damping in the tensioner. Another set of parameters available for the designer in developing a specific profile or trajectory of damping is through the control of the frictional properties of the interface between the ramp plate friction surface and the friction surface on the tensioner arm. There are a number of different methods for adjusting the friction properties of surfaces including specific surface treatments and finishes, structures, and even material selection. By modifying the friction properties of these surfaces, the designer has yet another tool available for manipulating the profile of frictional damping generated by the tensioner in response to movement of the tensioner arm. All of these different elements, and other elements in a specific embodiment of the tensioner are available for modification by those of ordinary skill in the art such that they might tailor a specific embodiment of the invention to have a desired asymmetric damping profile or relative asymmetric damping generated versus tensioner arm position thus providing a relationship between the level of damping generated verses the wind-up level of the device.

The ramp plate features may be coated or otherwise treated in order to minimize the ramp feature to ramp feature interface friction. Specific methods of achieving this goal can include coating the surface with a number of different materials including metallic, ceramic, and or plastic materials, including, but not limited to brass, aluminum, oil impregnated bronze, silicon nitride, Teflon® (polytetrafluoroethylene—PTFE), ultra high molecular weight polyethelyne (UHMWP), or high density polyethylene. These materials may either form the entire ramp feature as one unit or be applied to a substrate or structural materials in order to achieve specific load bearing and friction characteristics.

Another embodiment of the tensioner would have the ramp plate not be in contact with the tensioner arm during normal operation. The torsional spring could be selected to provide sufficient axial force to maintain separation of the ramp plate from the tensioner arm during normal operation. However, the operation of the device would remain the same. During a wind-up condition the movement of the ramp plate up the faces of the ramp features will overcome the axial force of the tensioner spring holding the ramp plate away from the tensioner arm and bring the two frictional surfaces in contact with a normal force that is a function of the amount of wind up, the design of the ramp features, and the spring constant of the torsional spring. The operation of this exemplary embodiment of the device would provide asymmetric frictional dampening for the tensioner to ameliorate the effects of wind-up on the operation of the tensioner.

Figure 5:
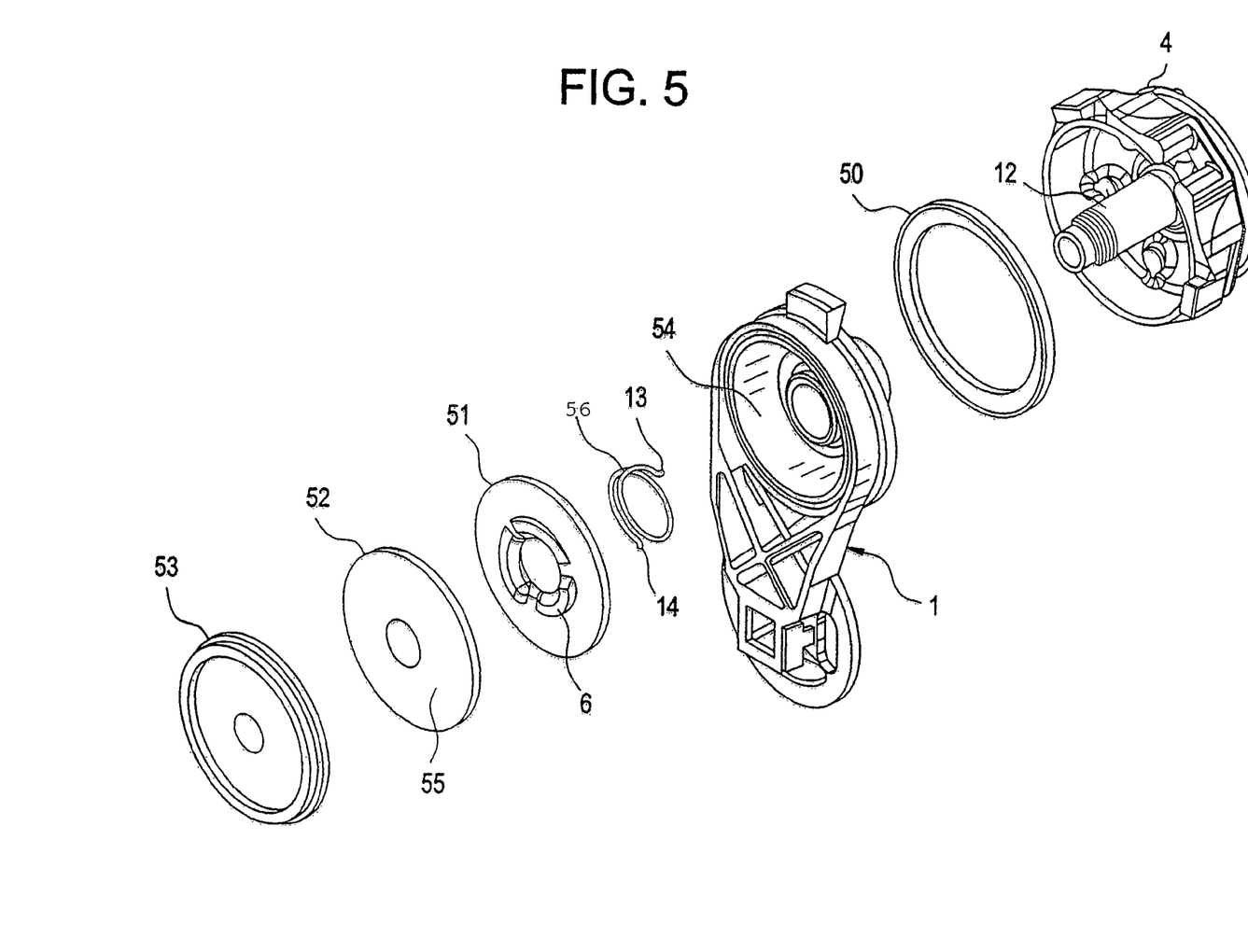
FIG. 5 is an exploded perspective view of a new tensioner assembly according to a second embodiment.
Figure 6:
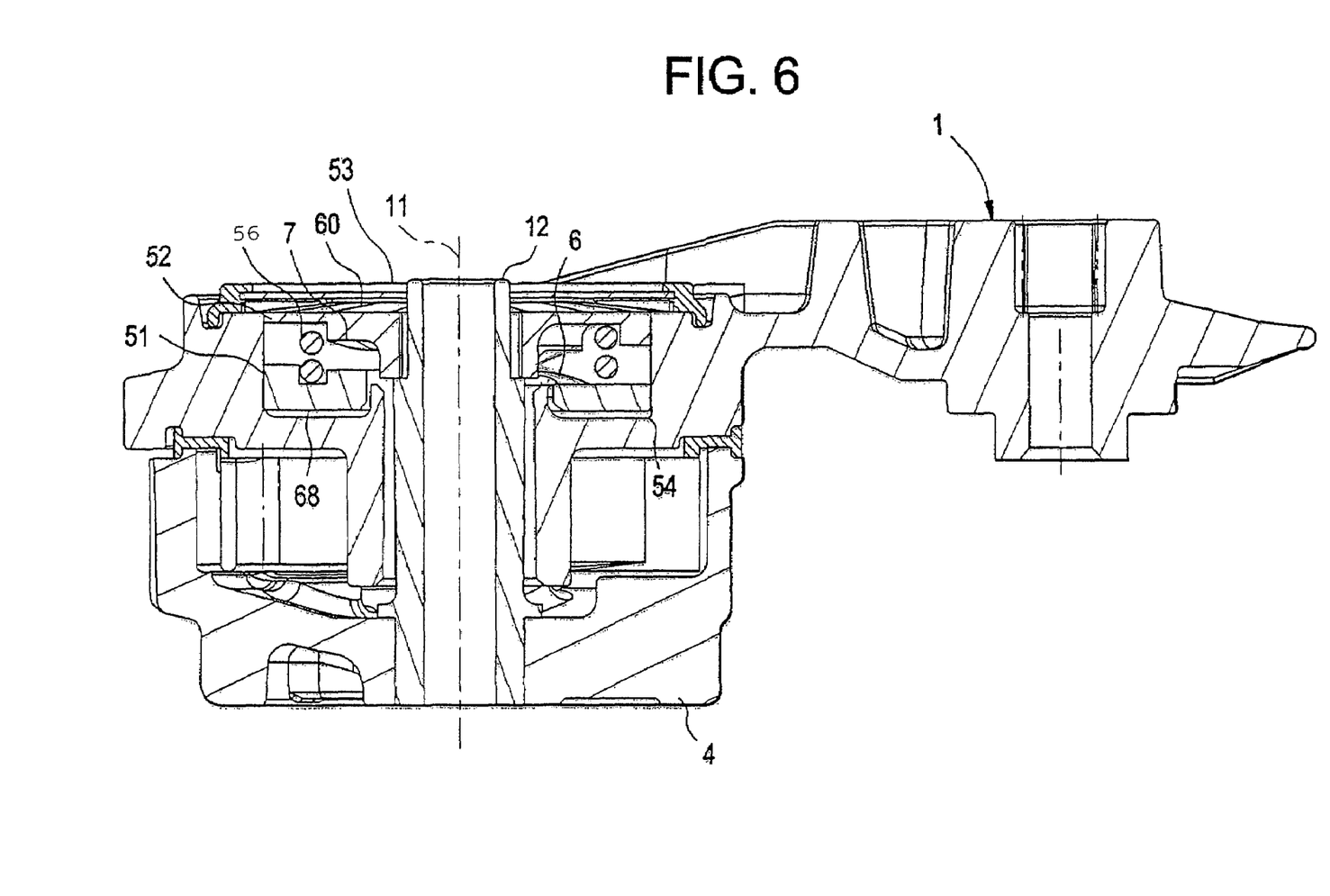
FIG. 6 is a cut away view of a new tensioner assembly according to a second embodiment.

FIG. 5 and 6 depict two views of another embodiment of a tensioner 10 with asymmetric damping. Referring to FIG. 5, a tensioner base 4 is shown, however in this embodiment the tensioner base 4 does not have fixed mating ramp features 6. The tensioner base 4 has an tensioner axle 12 that provides a bearing surface that enables both rotational and translational movement of parts in the tensioner 10. The embodiment of the tensioner 10 shown in FIG. 5 has a spring (not shown) inside the base 4 that links the base 4 to the arm 1 and provides the torsional force to the arm 1 that tensions the belt. A sealing ring 50 is provided between the tensioner base 4 and the arm 1. The sealing ring 50 seals the internal components of the tensioner 10 from the environment as well as preventing the escape of fluid from within the tensioner 10. The tensioner arm 1 has a cup 54. The cup 54 is adapted to accept a first ramp plate 51 and a second ramp plate 52 and allow them to rotate freely within the cup 54 and about the axle 12.

The embodiment of the tensioner 10 shown in FIG. 5 has a pair of moveable ramp plates to create a friction brake for the tensioner comprising, a first ramp plate 51 and a second ramp plate 52. The first ramp plate 51 has ramp features 7. The opposite of the first ramp plate 51, see FIG. 6, has a friction surface 68 that forms a friction interface with the inside of the cup 54. The friction surface 68 and the cup 54 can adopt a number of different forms including flat, as shown, cup and cone shaped, or ball and socket shaped. The friction interface between the friction surface 68 and the cup 54 rotatably links the movement of the first ramp plate 51 to the rotation of the tensioner arm 1 such that the a movement of the arm 1 urges the first ramp plate 51 to rotate in the same direction.

The second ramp plate 52, has mating ramp features 6, see FIG. 6. The ramp features 7 engage with the mating ramp features 6 when the second ramp plate 52 is assembled in the tensioner 10 with the first ramp plate 51. The opposite face of the second ramp plate 52 has a second friction surface 55 that interfaces with a cap friction surface 60 located on the end cap 53. As previously discussed, the friction surface is formed in using a selection of alternative fabrication techniques to achieve the desired friction interface characteristics. The end cap 53 is fixed to the axle 12 such that it does not substantially translate nor rotate along or about the pivot axis 11. The friction interface between the second friction surface 55 and the cap friction surface 60 uses frictional forces to prevent the rotation of the second ramp plate 52.

A ramp torsion spring 56 connects the first ramp plate 51 to the second ramp plate 52 and provides a rotational urge to each of the ramp plates. The rotational urge urges the ramp features 6 and the mating ramp features 7 to slide down each other to reduce the overall distance between the first ramp plate 51 and the second ramp plate 52. This movement due to the ramp torsion spring 56 reduces the normal force applied to the friction interface between the first ramp plate 51 and the tensioner arm 1, and the friction interface between the second ramp plate 52 and the end cap 53. The ramp torsion spring 56 has tangs 13 and 14 that interface with slots (not shown) on the first ramp plate 51 and the second ramp plate 52 to transfer the torsional forces.

The another embodiment of the tensioner disclosed herein achieves asymmetric damping by using a pair of moveable brake elements, or ramp plates. During normal tensioning, the first ramp plate 51 and the second ramp plate 52 are urged by the ramp torsion spring 56 such that the ramp features 7 on the first ramp plate 51 and the mating ramp features 6 on the second ramp plate are substantially aligned. When the ramp features 7 and the mating ramp features 6 are substantially aligned, the distance between the first ramp plate 51 and the second ramp plate 52 is minimized. During backlash, the movement of the tensioner arm 1 in the direction B urges the first ramp plate 51 and its corresponding ramp features 7 to move up the mating ramp features 6 on the second ramp plate 52. The movement of the ramp features 7 up the mating ramp features 7 is partially dictated by the severity of the wind-up condition, the configuration of the ramp features 6 and 7, and the characteristics of the ramp torsion spring 56. A designer may select the characteristics of the ramp string 56, the profile and characteristics of the ramp features 6 and 7, and the friction interfaces between the first ramp plate 51 and the cup 54 and the second ramp plate 52 and the end cap 53 in order to achieve desired asymmetric damping profiles relative to the wind-up conditions encountered using techniques as described above.

The movement of the ramp features 7 up the second ramp plate features 6 urges the first ramp plate 51 to separate from the second ramp plate 52. This urge is manifest as an increase in the normal force applied to the frictional interface between the first ramp plate 51 and the cup 54 as well as the second ramp plate 52 and the end cap 53. The increase in normal force as these friction interfaces, increases the frictional force generated at the interfaces. The increasing frictional force combats windup of the tensioner arm 1, thereby providing the tensioner 10 with asymmetric damping characteristics.

In yet another embodiment, the first ramp plate 51 is formed into the cup 54 as one contiguous element. Then the torsion spring 2 would provide its rotational urge directly from the tensioner arm 1 to the second ramp plate 52. In this yet another embodiment, the only friction interface is formed between the second friction surface 55 and the cap friction surface 60. In still another embodiment, the mating ramp features 7 are integrated into the end cap 53 and the frictional interface between the first ramp plate 51 and the cup 54 provides all of the frictional dampening for the tensioner.

The embodiments of this invention shown in the drawing and described above are exemplary of numerous embodiments that may be made within the scope of the appended claims. It is contemplated that numerous other configurations of the tensioner assemblies may be created taking advantage of the disclosed approach. In short, it is the applicant's intention that the scope of the patent issuing herefrom will be limited only by the scope of the appended claims.

What is claimed is:

1. A tensioner comprising:
   a tensioner base defining a pivot axis;
   an arm pivotable about the pivot axis;
   a first ramp plate that is pivotable about the pivot axis and translatable along the pivot axis, the first ramp plate comprising:
      a friction surface in contact with the arm; and
      a ramp surface generally opposite the friction surface, the ramp surface having a plurality of first ramp features protruding therefrom at an angle;
   a second ramp plate comprising a mating ramp surface that has a plurality of second ramp features protruding therefrom at an angle, wherein the second ramp plate is positioned against the first ramp plate with the first ramp features and the second ramp features in a mating relationship of oppositely angled protrusions; and
   a torsion spring coupled to the first ramp plate, wherein the torsion spring is capable of providing a torsional force to the first ramp plate to pivot the first ramp plate about the pivot axis relative to the second ramp plate to urge the first ramp features to slide along the second ramp features which causes translation of the first ramp plate toward the arm for increased friction between the friction surface of the first ramp plate and the arm to dampen movement of the arm.

2. A tensioner as recited in claim 1, wherein the torsion spring couples the first ramp plate to the arm.

3. A tensioner as recited in claim 2, wherein the first ramp plate is interposed between the tensioner base and the arm.

4. A tensioner as recited in claim 1, wherein the torsion spring couples the first ramp plate to the second ramp plate.

5. A tensioner as recited in claim 4, wherein the second ramp plate is integrated with the tensioner base to form a single part.

6. A tensioner as recited in claim 1, wherein the first ramp plate is mounted about the pivot axis defined by the tensioner base.

7. A tensioner as recited in claim 1, wherein the second ramp plate is mounted about the pivot axis such that the second ramp plate may pivot about the pivot axis and translate along the pivot axis.

8. A tensioner as recited in claim 7, wherein the second ramp plate has a second friction surface in contact with an end cap that is substantially fixed such that it does not translate along nor rotate about the pivot axis.

9. A tensioner as recited in claim 1, wherein the first ramp features and the second ramp features are selected to provide a desired change in frictional damping in response to the arm pivoting.

10. A tensioner as recited in claim 1, wherein the first ramp features and the second ramp features are fabricated from a friction reducing material.

11. A tensioner as recited in claim 10, wherein the first ramp features and the second ramp features and the friction surface are selected to provide a desired change in frictional damping in response to the arm pivoting.

12. A tensioner recited in claim 1, wherein the first ramp features and the second ramp features are in a substantially circumferential array about the pivot axis.

13. A tensioner as recited in claim 1, wherein rotation of the arm in an untensioning direction loads the torsion spring with increased torsional force that rotates the first ramp plate about the pivot axis urging the first ramp features to slide along the second ramp features as the arm rotates in the untensioning direction.

14. A tensioner as recited in claim 13, wherein as the increased torsional force dissipates the arm rotates in a tensioning direction and the first ramp features slide back along the second ramp features in the opposite direction which moves the first ramp plate translationally away from the arm thereby decreasing the force applied to the friction surface to dampen movement of the arm.

15. A tensioner comprising:
a tensioner base defining a pivot axis;
an arm mounted on the tensioner base so as to permit the arm to pivot about the pivot axis;
a first ramp plate mounted on the tensioner base so as to permit the first ramp plate to pivot about the pivot axis and translate along the pivot axis;
wherein the first ramp plate comprises:
a friction surface facing the arm; and
a ramp surface generally opposite the friction surface, the ramp surface having a plurality of first ramp features protruding therefrom at an angle; and
a second ramp plate having a mating ramp surface that has a plurality of second ramp features protruding therefrom at an angle;
wherein the first ramp features are in contact with the second ramp features;
wherein pivoting the first ramp plate in a direction that moves the first ramp features along the second ramp features causes the first ramp plate to translate relative to the pivot axis for increased friction between the friction surface of the first ramp plate and the arm to provide asymmetric frictional damping.

16. A tensioner as recited in claim 15, wherein the first ramp plate is interposed between the tensioner base and the arm.

17. A tensioner as recited in claim 15, wherein the first ramp plate is coupled to the arm for pivoting therewith about the pivot axis.

18. A tensioner as recited in claim 15, further comprising an end cap substantially fixed to the pivot axis; wherein the second ramp plate is capable of translation along the pivot axis and rotation about the pivot axis, and is interposed between the ramp surface of the first ramp plate and the end cap.

19. A tensioner as recited in claim 18, wherein the rotation of the second ramp plate is linked to the rotation of the first ramp plate by a ramp plate spring.

20. A tensioner as recited in claim 15, further comprising a torsion spring coupled to the first ramp plate, the torsion spring capable of providing a torsional force to the first ramp plate to pivot the first ramp plate about the pivot axis in a direction that moves the first ramp features along the second ramp features of the second ramp plate.

21. A tensioner as recited in claim 20, wherein rotation of the arm in an untensioning direction loads the torsion spring with increased torsional force, wherein the increased torsional force rotates the first ramp plate about the pivot axis urging the first ramp features along the second ramp features.

22. A tensioner as recited in claim 21, wherein as the increased torsional force dissipates the arm rotates in a tensioning direction and the first ramp features slide back along the second ramp features in the opposite direction which moves the first ramp plate translationally away from the arm thereby decreasing the force applied to the friction surface to dampen movement of the arm.

* * * * *

UNITED STATES PATENT AND TRADEMARK OFFICE
CERTIFICATE OF CORRECTION

| | |
|---|---|
| PATENT NO. | : 7,678,002 B2 |
| APPLICATION NO. | : 11/514136 |
| DATED | : March 16, 2010 |
| INVENTOR(S) | : Robert C. Joslyn |

Page 1 of 1

It is certified that error appears in the above-identified patent and that said Letters Patent is hereby corrected as shown below:

Claim 18, Col. 12, Line 19, "the ramp surface of" should be deleted.

Signed and Sealed this

Twenty-fifth Day of May, 2010

David J. Kappos
*Director of the United States Patent and Trademark Office*